United States Patent

Edwards

[15] 3,636,512

[45] Jan. 18, 1972

[54] OPTICAL SYMBOL RECOGNITION SYSTEM

[72] Inventor: Louis J. Edwards, Salt Lake City, Utah

[73] Assignee: Hercules Incorporated, Wilmington, Del.

[22] Filed: Feb. 4, 1970

[21] Appl. No.: 8,499

[52] U.S. Cl.............340/146.3 F, 235/61.11 E, 250/219 CR, 340/146.3 P, 350/160 P

[51] Int. Cl...................G06k 9/08, G01n 21/30, G06k 7/12, G02f 1/28

[58] Field of Search......................235/61.11 E; 250/219 CR; 356/71; 350/160 P, 162 SF; 340/146.3 P, 146.3 F

[56] References Cited

UNITED STATES PATENTS

| | | | |
|---|---|---|---|
| 3,085,469 | 4/1963 | Carlson | 350/160 P |
| 3,483,513 | 12/1969 | Burckhardt | 340/146.3 P |
| 3,435,244 | 3/1969 | Burckhardt | 340/146.3 P |
| 3,519,992 | 7/1970 | Rau | 340/146.3 P |
| 3,497,704 | 2/1970 | Holmes | 340/146.3 P |
| 3,039,582 | 6/1962 | Simjian | 194/4 |

*Primary Examiner*—Thomas A. Robinson
*Assistant Examiner*—Robert M. Kilgore
*Attorney*—Michael B. Keehan

[57] ABSTRACT

An automatic reading apparatus composed of three main parts is provided. The first performs image formation on photochromic material, the second performs image recognition by way of optical spatial filtering and the third part of the system converts the recognized image into useable readout.

7 Claims, 3 Drawing Figures

IMAGE RECOGNITION SYSTEM

IMAGE FORMATION SYSTEM

IMAGE READING SYSTEM

IMAGE RECOGNITION SYSTEM

LOUIS J. EDWARDS
*INVENTOR.*

BY William J. Smith

*AGENT*

OPTICAL SYMBOL RECOGNITION SYSTEM

This invention relates to an optical symbol recognition and reading system, and more particularly, to a fast image forming and image reading system made possible by photochromic materials and technique. Once recognized, the image sought is read out audibly or used to translate, index, or function as a control for other devices. The recognition process is accomplished by optical spatial filtering techniques wherein images of written material or other desirably recognized material are formed and the symbols thereof are optically recognized and read out.

Optical spatial filtering techniques have been employed in the prior art for symbol recognition. The technique, however, in accordance with this invention is used in a system which forms images on quick reacting photochromic materials (plates of film or glass) and nearly simultaneously performs symbol recognition and transforms the symbols into speech, print or control functions. Previous systems have used photographic films for forming a transparency of the image to be recognized. This is time consuming in that the film must go through a separate developing process. It is costly in that the film cannot be used for more than one image, although it can be retained for reuse of the same image. On the other hand, photochromic material is reuseable for many different images. Characters (symbols, letters, bits, etc.,) from reflected copy are imaged by light (ultraviolet or visible) through lenses onto photochromic film. The image begins forming immediately upon illumination without separate development processing. The time required to form an image suitable for recognition purposes depends on the type of photochromic material and on the intensity of the illuminating source.

There are some existing image recognition and reading devices that focus each character or bits of information from an array of bits (e.g., a single alpha-bit from a printed or typed sheet) and sequentially, by line scanning evaluates each bit. However, none of these devices image an entire sheet of bits of diverse sizes, shapes, etc., and automatically recognizes and designates the location of each.

Accordingly, a primary object of this invention is to eliminate the foregoing deficiencies of the prior art. Other objects of the invention will appear hereinafter, the novel features and combinations being set forth in the appended claims.

Generally described, the present invention contemplates an automatic reading apparatus composed of three main parts. The first performs the image formation on photochromic materials, the second performs image recognition via optical spatial filtering and the third part of the system converts the recognized image into useable readout.

More particularly, the present invention is directed to apparatus for recognizing a specific pattern on an object comprising a first source of light having a beam-limiting aperture for causing light to be projected on the specific pattern; a first imaging lens for focusing reflected light from the specific pattern onto a photochromic image plate; a second source of light having a beam spreader followed by a converging lens for causing said light to be projected onto a point mirror and reflected therefrom through the first imaging lens onto the photochromic image plate as direct collimated light; a transform lens for causing the direct collimated light passing through the photochromic image plate to focus on a code filter plate and causing the diffracted light to impinge at various points on said code filter plate to give a diffraction pattern characteristic of the specific pattern, and a second imaging lens for causing light passing through the code filter plate to form an image of the specific pattern on a recognition source.

A preferred embodiment of the invention has been chosen for purposes of illustration and description and is shown in the accompanying schematic drawings forming a part of the specification with reference symbols referring to like parts wherever they occur and wherein.

Figure 1:
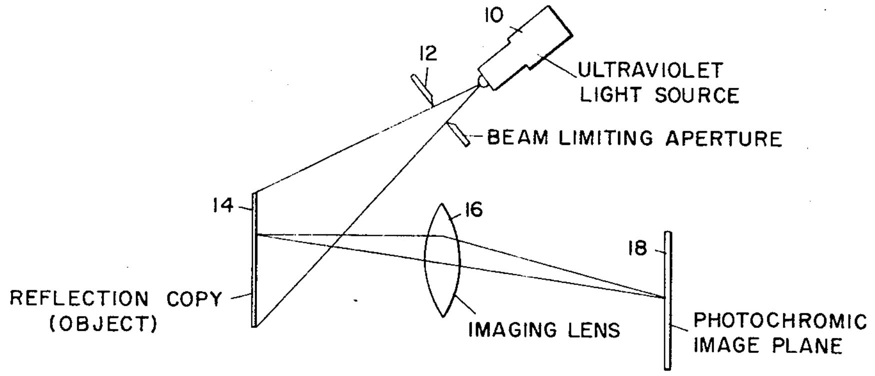
FIG. 1 depicts the image formation aspect of the apparatus.

The three figures combine to depict the complete apparatus and are shown separately for clarity.

Figure 2:
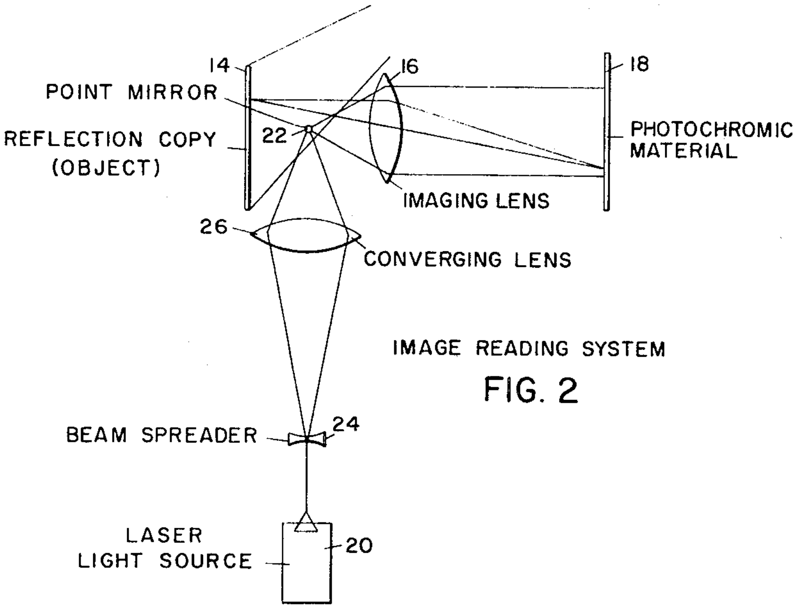
FIG. 2 depicts the image reading aspect of the apparatus.
Figure 3:
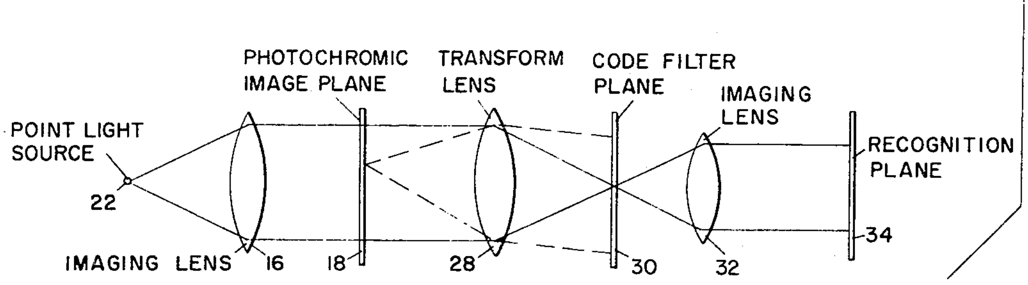
FIG. 3 depicts the image recognition aspect of the apparatus.

For purposes of description in conjunction with the schematic drawings, an example of operation of the invention is presented under the following headings: (a) Image Formation; (b) Image Reading; (c) Image Recognition; (d) Code Sequencing Methods; and (e) Output Systems. The Code Sequencing Methods and Output Systems are not shown in the drawings since they represent conventional procedures for utilizing the invention.

a. Image Formation. The first part of the system forms opaque-clear images on photochromic material. FIG. 1 depicts the image formation aspect of the apparatus. An ultraviolet (UV) light source 10 passing through a beam limiting aperture 12 illuminates a typical reflection copy 14 in an area where a symbol, letter, character or any other specific pattern is desired. The typical reflection copy 14 has a white background while the symbols, lettering and the like are dark. The UV radiation source is chosen to be close to visible violet light in its wavelength. It is sufficiently close so that appreciable UV reflection occurs from copy areas that appear white and less from areas that are visibly dark. With this choice of UV source, conventional optics can be used to form a UV image. Thus, the reflection passes through a lens 16 and onto a photochromic image plate 18 positioned at the image plane. The photochromic material is chosen for its speed and sensitivity to the UV radiation. Photochromic material is known to form high resolution images for holography and other image forming purposes in view of its reversible color changes when exposed to UV light. This is well disclosed by G. K. Megla, "Optical Properties and Applications of Photochromic Glass," Applied Optics, June 1966, p. 945–960.

b. Image Reading. For image reading, a laser light source 20 is used in conjunction with known optical components to create a "point light source." A typical arrangement is depicted in FIG. 2 with a point mirror 22 being the "point light source." This mirror and its suspension system is sufficiently minute so as to not obscure image information from the reflection copy 14. Various mirror and mirror suspension systems can be utilized to accomplish the purpose of imposing the reading light on the image-forming light. Beam splitters can also accomplish the above task of combining the two lights. The mirror 22 is positioned at the focal point of the imaging lens 16. The laser light source 20 is spread by beam spreader 24 and is positioned in respect to converging lens 26 so that the copy image at plate 18 is entirely covered with collimated light as reflected from point mirror 22.

c. Image Recognition. Image recognition is achieved by the technique of optical spatial filtering. This technique is well disclosed by Vincent J. Horvath, et al., "Holographic Technique Recognizes Fingerprints," Laser Focus, June 1967, p. 18–23 and George W. Stroke, "Coherent Optics and Holography," Academic Press, N.Y. 1966, p. 79–96. As explained for these systems, FIG. 3 depicts a basic optical spatial filtering recognition configuration. The point source of light from the point mirror 22 is collimated by the first lens 16. The collimated light passes through the clear-opaque image on the photochromic glass 18. This image passes some of the light directly while a portion is diffracted at various angles to the optical axis of the system as represented by the dashed lines. The direct collimated light passing through the transform lens 28 is focused to a point on the optical axis in the focal plane. The diffracted light impinges at various points on the focal plane to become a diffraction pattern characteristic of the image.

A spatial filter 30 is located at the focal plane. The spatial filter 30 is the positive transparency of a diffraction pattern of the image. This is termed the code pattern. If the diffraction pattern of the photochromic image correlates well with the code pattern, more light passes through the coded filter than would otherwise pass. The "passed" light is thus projected through imaging lens 32 and images on the recognition source plane 34. For specially prepared spatial filters, i.e., for holographic filtering a bright point appears on the recognition plane or screen. The bright spot position on the screen is the same as the relative central position of the image and in case of this invention on the photochromic film. The relative intensity of the spot depends on the correlation between the image diffraction pattern and code pattern. In this manner one symbol in several on the film can be spatially separated from others on the recognition plane. Thus, one letter or word in the image film can be singled out and spatially placed on the recognition plane.

d. Code Sequencing Methods. It will be appreciated that in accordance with this invention the previously described image recognition source can be utilized as an input to various control systems such as optical readers, indexers, etc. To accomplish objectives of this nature, two of several methods for changing the code transparencies are given by way of example. Since these procedures are conventional, they are not illustrated in the drawings. In a typical setup a photochromic image will contain several symbols or words. A specific application of indexing will be presented in the following to illustrate code scanning methods.

As an example of this method, consider the case where a book is to be indexed by tabulating the page numbers on which several key words or phrases occur. A code transparency is created for each word or phrase to be indexed. The code transparency is made from am image of the desired word in the same type or lettering as used in printing the book. The code transparencies are assembled into a motion picture film strip. The film strip is run through the code filter plane. For each page that appears in the photochromic image plane the code transparencies go through a complete cycle of the desired index. During this cycle, each code word transparency is momentarily stopped at the filter plane and the image reading light is allowed to illuminate the photochromic material. The light is controlled by a code scanner to be on only when a code frame is stopped in the filter plane. The light source can be a UV light source as heretofore described or a pulsed laser source or still another in which an optical shutter controls light passage through the system.

The code scanner also keeps track of the sequencing of the code. Thus, when a certain word appears on the photochromic image plane its signal will be recorded as reaching the recognition plane only when its code is in the filter plane. Any number of combinations of mechanical, electrical and/or optical systems can be sequenced so as to record the page numbers on which the index word appears.

An example of another type of code scanner which may be used is one in which all codes are mounted on a single filter wheel. The scanner sequentially places each filter in place and then allows the reading light to illuminate the image.

e. Output Systems. Output systems for use in conjunction with the present invention include readers, indexers, printers, and the like, wherein the system takes a recognized symbol and uses it to perform a function. The system previously mentioned which took the recognized index word and printed out the page numbers on which the word appears is one example of such systems.

Another important system resides in an automatic print-to-braille translation machine as follows: A code film reel is created of each word in a specified vocabulary using the same printing type as a certain publisher or press. A high-speed scanner rungs the reel. Each recognized symbol puts a light spot on the recognition plan in its proper position relative to all the other words. The light point itself or a photocell mosaic can be used to detect position and direct the braille printer. The printer is sequenced by the filter codes so that only the word recognized is printed at the time of recognition. That is, the printer is slaved to the scanner. It is directed in spatial positioning by the detectors on the recognition plane.

From the foregoing it will be appreciated that the present invention has certain advantages over state of the art recognition systems. For example, if sufficiently strong light sources are used, it is possible to obtain the same optical densities with photochromic materials as are obtainable with photographic materials. Moreover, since no chemical development of a latent image is necessary, as in photography and since photochromic materials permit direct image forming, the process of recognition is much faster. Also, since the optical density of photochromic materials may be changed (activated or bleached) simply by the presence or absence of light, all components of the system are adapted to be operated with improved reproducibility.

What I claim and desire to protect by Letters Patent is:

1. Apparatus for recognizing a specific pattern or an object comprising:

a. first light means for projecting a beam of light having a first wavelength onto the specific pattern,
b. a first imaging lens for focusing reflected light from the specific pattern onto a photochromic image plate sensitive to light of said first wavelength,
c. second light means for projecting a collimated beam of light of a second different wavelength onto and through said photochromic image plate,
d. a transform lens for causing the collimated light passing directly through the photochromic image plate to focus on a code filter plate and causing the diffracted light to impinge at various points on said code filter plate to give a diffraction pattern characteristic of the specific pattern, and
e. a second imaging lens for causing light passing through the code filter plate to indicate the identity of the specific pattern on a recognition source.

2. The apparatus of claim 1 wherein the first source of light is light of short wavelength.

3. The apparatus of claim 2 wherein the light of short wavelength is ultraviolet.

4. The apparatus of claim 1 wherein the second source of light is light of long wavelength.

5. The apparatus of claim 4 wherein the light of long wavelength is laser light.

6. The apparatus of claim 1 wherein the photochromic image plate comprises photochromic film or glass.

7. Pattern recognition apparatus comprising:

a. first light means for projecting a beam of light having a first wavelength onto a specific pattern,
b. photochromic image means sensitive to light of said first wavelength,
c. means for focusing light reflected from said pattern onto said photochromic image means,
d. second light means for projecting a collimated beam of light having a second wavelength through said photochromic image means, and
e. means responsive to the diffracted light of said second light means passing through said photochromic image means for determining the identity of said specific pattern.

* * * * *